(12) United States Patent
Chen et al.

(10) Patent No.: US 8,942,154 B2
(45) Date of Patent: Jan. 27, 2015

(54) METHOD, BM-SC AND BASE STATION FOR MULTIPLEXING MBMS SERVICES IN MBSFN

(75) Inventors: Yu Chen, Shanghai (CN); He Wang, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 257 days.

(21) Appl. No.: 13/318,074

(22) PCT Filed: Apr. 29, 2009

(86) PCT No.: PCT/CN2009/000472
§ 371 (c)(1),
(2), (4) Date: Oct. 28, 2011

(87) PCT Pub. No.: WO2010/124421
PCT Pub. Date: Nov. 4, 2010

(65) Prior Publication Data
US 2012/0051281 A1    Mar. 1, 2012

(51) Int. Cl.
*H04H 20/71*  (2008.01)
*H04W 36/38*  (2009.01)
(Continued)

(52) U.S. Cl.
CPC ....... *H04W 36/385* (2013.01); *H04N 21/23655* (2013.01); *H04N 21/2385* (2013.01); *H04N 21/6131* (2013.01); *H04N 21/6473* (2013.01); *H04W 4/12* (2013.01)
USPC .......................................................... 370/312

(58) Field of Classification Search
CPC .................................................. H04W 36/385
USPC ........................................ 370/312; 709/224
See application file for complete search history.

(56) References Cited

U.S. PATENT DOCUMENTS 8,588,063 B2    11/2013    Van Leekwijck et al.
2005/0070256 A1    3/2005    Hu
(Continued)

FOREIGN PATENT DOCUMENTS

CN    101076176 A    11/2007
CN    101076176 A    11/2007
(Continued)

OTHER PUBLICATIONS

International Search Report for PCT/CN2009/000472 dated Feb. 11, 2010.
(Continued)

*Primary Examiner* — Wei Zhao
(74) *Attorney, Agent, or Firm* — Fay Sharpe LLP

(57) ABSTRACT

A method for multiplexing multiple MBMS services in an MBSFN is provided according to the present invention, comprising: at the beginning of a session, determining, by a BNA-SC, MBMS services to be multiplexed together; estimating, by the BM-SC, bandwidth requirement needed for multiplexing the MBMS services together and informing an MCE of the bandwidth requirement so as to assign radio resources by the MCE; receiving, by the BM-SC, packet data for the MBMS services to be multiplexed together, from a server; prioritizing, by the BM-SC, the MBMS services to be multiplexed together if the actual bandwidth that is occupied by the packet data for the MBMS services to be multiplexed together exceeds the bandwidth requirement; reordering, by the BM-SC, the packet data for the MBMS services to be multiplexed together according to the result of prioritization, and informing respective base stations in the MBSFN area of the result of reordering; and multiplexing, by respective base stations, the packet data for the MBMS services to be multiplexed together on radio resources assigned by the MCE and transmitting the multiplexed packet data according to the result of reordering informed by the BM-SC.

7 Claims, 3 Drawing Sheets

(51) Int. Cl.
*H04N 21/2365* (2011.01)
*H04N 21/2385* (2011.01)
*H04N 21/61* (2011.01)
*H04N 21/647* (2011.01)
*H04W 4/12* (2009.01)

(56) References Cited

U.S. PATENT DOCUMENTS

| | | | |
|---|---|---|---|
| 2008/0198814 A1* | 8/2008 | Wengerter et al. | 370/336 |
| 2008/0205322 A1* | 8/2008 | Cai et al. | 370/312 |
| 2009/0010180 A1 | 1/2009 | Xue et al. | |

FOREIGN PATENT DOCUMENTS

| | | |
|---|---|---|
| CN | 101262635 A | 9/2008 |
| CN | 101370157 A | 2/2009 |
| CN | 101394338 A | 3/2009 |
| EP | 1 879 403 A | 1/2008 |
| EP | 2 012 464 A2 | 1/2009 |
| JP | 2005-110257 | 4/2005 |
| JP | 2010-532648 | 10/2010 |
| KR | 10-2008-0006596 A | 1/2008 |
| KR | 10-2009-0034320 A | 4/2009 |
| WO | WO 2006/110876 A2 | 10/2006 |
| WO | WO 2008/000768 A1 | 1/2008 |
| WO | WO 2009/006553 A1 | 1/2009 |
| WO | WO 2009/021408 A1 | 2/2009 |

OTHER PUBLICATIONS

European Search Report, Apr. 28, 2014.
Alcatel Lucent: "E-MBMSService multiplexing, Scheduling and data handling Document: Discussion & decision," 3GPP Draft; Mobile Competence Center, Sophia-Antipolis Cedex, France, vol. RAN WG2, No. Jeju: 20071112, Nov. 12, 2007.
Alcatel Lucent: "E-MBMS functions of statistical multiplexing," 3GPP Draft; Mobile Competence Center, Sophia-Antipolis Cedex, France, vol. RAN WG3, No. 20071003, Oct. 3, 2007.
"eMBMS Stage 2 description for release," 3GPP TSG-RAN3 Meeting #63bis, Seoul, Korea, Mar. 23-26, 2009, pp. 1-10.
"Open Issues on resource allocation and multiplexing," 3GPP TSG RAN WG3 #59 bis, Shenzhen, China, Mar. 31-Apr. 3, 2008, pp. 1-3.
3GPP TS 36.300, V8.8.0, Mar. 2009.
"On the MBMS service recovery in prioritization," 3GPP TSG-RAN WG RAN2 #46-bis, Beijing, China, Apr. 4-8, 2005, pp. 1-3.

* cited by examiner

METHOD, BM-SC AND BASE STATION FOR MULTIPLEXING MBMS SERVICES IN MBSFN

FIELD OF THE INVENTION

The present invention relates to wireless communication field, and more particularly to a method, a BM-SC (Broadcast Multicast Service Center) and a base station for multiplexing multiple MBMS (Multimedia Broadcast Multicast Service) services in MBSFN (Multicast Broadcast Single Frequency Network), and is capable of achieving centralized management of resource allocation when multiple MBMS services are multiplexed in the MBSFN network, to meet the requirement for synchronization of MBSFN transmission.

BACKGROUND OF THE INVENTION

As is known, MBSFN (Multicast Broadcast Single Frequency Network) transmission for eMBMS (Enhanced Multimedia Broadcast Multicast Service) is negotiated as a basic feature of version 9 of eMBMS. For an efficient and correct MBSFN transmission, it is necessary to utilize the same radio resources to simultaneously transmit the same content data packets in the air. It is clear that the MBSFN transmission requires some coordination including resource allocation, radio configuration and scheduling, among multiple related eNBs (base stations). On the other aspect, service multiplexing is supported in version 9 of eMBMS to take the gain of radio resource efficiency into account.

Here, it needs to be pointed out that the applicant of the present application has proposed dividing the MBMS services for MBSFN transmission into two types. One is statistical multiplexing services and the other is non-statistical multiplexing services. Those services having the same QoS requirement of BLER (Block Error Rate) (e.g. having the same modulation coding scheme) may be multiplexed as one MAC PDU (Media Access Control—Protocol Data Unit), which is known as statistical multiplexing. All services multiplexed to one MAC PDU are defined as one service group. This is a general idea of statistical multiplexing proposed by the applicant and has been agreed by 3GPP (Third Generation Partnership Project).

However, the prior art only provides a general description of multiplexing MBMS services without taking into account the details of how to multiplex the MBMS services.

SUMMARY OF THE INVENTION

The present invention is proposed to overcome the defect of the prior art. It is thus an object of the present invention to provide a method, a BM-SC and a base station for multiplexing multiple MBMS services in MBSFN, and capable of achieving centralized management of resource allocation when multiple MBMS services are multiplexed in the MBSFN network, to meet the requirement for synchronization of MBSFN transmission.

According to the present invention, a method for multiplexing multiple Multimedia Broadcast Multicast Service (MBMS) services in a Multicast Broadcast Single Frequency Network (MBSFN) is provided, the method comprising: at the beginning of a session, determining, by a Broadcast Multicast Service Center (BM-SC), MBMS services to be multiplexed together; estimating, by the BM-SC, bandwidth requirement needed for multiplexing the MBMS services together and informing an MBMS Coordination Entity (MCE) of the bandwidth requirement so as to assign radio resources by the MCE; receiving, by the BM-SC, packet data for MBMS services to be multiplexed together, from a server; prioritizing, by the BM-SC, the MBMS services to be multiplexed together if the actual bandwidth that is occupied by packet data for the MBMS services to be multiplexed together exceeds the bandwidth requirement; reordering, by the BM-SC, the packet data for the MBMS services to be multiplexed together according to the result of prioritization, and informing respective base stations in the MBSFN area of the result of reordering; and multiplexing, by respective base stations, the packet data for the MBMS services to be multiplexed together on the radio resources assigned by the MCE and transmitting the multiplexed packet data according to the result of reordering informed by the BM-SC.

Preferably, the MBMS services to be multiplexed together are determined by the BM-SC according to Quality of Service (QoS) requirement of bit error rates of the MBMS services.

Preferably, the bandwidth requirement is determined by the BM-SC according to Quality of Service (QoS) requirement of transmission rates or bit error rates of the MBMS services, and the prioritization is performed by the BM-SC according to Quality of Service (QoS) requirement of transmission rates or bit error rates of the MBMS services.

Preferably, the reordering is to arrange packet data for the MBMS services with higher priority prior to packet data for the MBMS services with lower priority so that the packet data for the MBMS services with higher priority can be transmitted earlier.

Preferably, the result of reordering is informed by a content synchronization entity in the BM-SC to a counterpart content synchronization entity in a base station.

Furthermore, according to the present invention, a Broadcast Multicast Service Center (BM-SC) for multiplexing multiple Multimedia Broadcast Multicast Service (MBMS) services in a Multicast Broadcast Single Frequency Network (MBSFN) is provided, the BM-SC comprising: determining means for determining, at the beginning of a session, MBMS services to be multiplexed together; estimating means for estimating bandwidth requirement needed for multiplexing the MBMS services together, and informing an MBMS Coordination Entity (MCE) of the bandwidth requirement so as to assign radio resources by the MCE; receiving means for receiving packet data for the MBMS services to be multiplexed together, from a server; prioritizing means for prioritizing the MBMS services to be multiplexed together if the actual bandwidth that is occupied by packet data for the MBMS services to be multiplexed together exceeds the bandwidth requirement; and reordering means for reordering the packet data for the MBMS services to be multiplexed together according to the result of prioritization, and informing respective base stations in the MBSFN area of the result of reordering.

In addition, according to the present invention, a base station for multiplexing multiple Multimedia Broadcast Multicast Service (MBMS) services in a Multicast Broadcast Single Frequency Network (MBSFN) is provided, the base station comprising: reordering result receiving means for receiving the result of reordering packet data for MBMS services to be multiplexed together, informed by a BM-SC; multiplexing means for multiplexing packet data for MBMS services to be multiplexed together on the assigned radio resources, according to the received result of reordering packet data for MBMS services to be multiplexed together; and transmitting means for transmitting multiplexed packet data.

BRIEF DESCRIPTION OF THE DRAWINGS

The above object, advantages and features of the present invention will become obvious by making references to the following detailed description of preferred embodiments in conjunction with the accompanying drawings, in which.

DETAILED DESCRIPTION OF EMBODIMENTS

Figure 1:
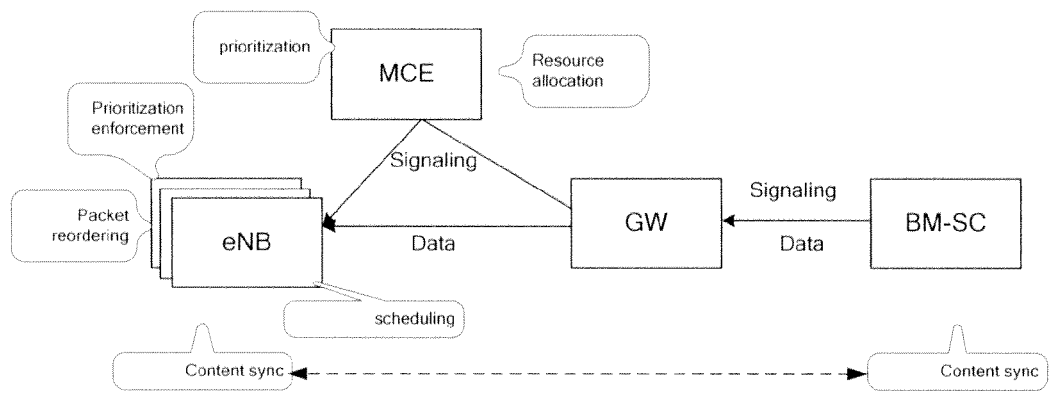
FIG. 1 is a system architecture diagram illustrating the distributed management of resource allocation when MBMS services are multiplexed.

FIG. 1 is a system architecture diagram illustrating the distributed management of resource allocation when MBMS services are multiplexed. In the distributed management, packet reordering and resource scheduling is done locally in eNBs (base stations).

Network architecture as illustrated by FIG. 1 comprises BM-SC, GW (Gateway), eNB and MCE (MBMS Coordination Entity).

In the system as illustrated by FIG. 1, it is necessary to use: content synchronization algorithm, part of resource allocation signaling, packet reordering algorithm, and dynamic scheduling signaling.

In the system as illustrated by FIG. 1, the basic process for multiplexing MBMS services is as follows:

1) The packets from BM-SC pass content synchronization entities to ensure the data at different eNBs in the MBSFN area synchronized.

2) The BM-SC only manages the session start/stop/update signaling.

3) The MCE allocates radio resources according to O&M (Operation and maintenance) configuration.

4) When the MBMS services are multiplexed on limited resources, respective MBMS services to be multiplexed need to be prioritized by MCE.

For example, BM-SC sends priority information in QCI (Quality Control Information). When MCE receives the priority information, it indicates eNBs to transmit the MBMS services with higher priority earlier than the MBMS services with lower priority. Thus, data of the MBMS services with the lower priority may be dropped.

5) The eNB carries out the prioritization decision ("Prioritization enforcement" as shown in FIG. 1) on respective MBMS services according to the indication from MCE in a distributed but synchronized manner. Thus, in the distributed scheme, packet data of the MBMS services with the lower priority is dropped in eNB.

6) The packet data of these MBMS services are transmitted over multicast network from GW to eNB. The packet data of different MBMS services may arrive arbitrarily. In eNB, the packet data for these MBMS services are transmitted period by period (e.g. 320 ms as a period), and are reordered so that all packets for MBMS service 1 with highest priority are transmitted first, and all packets for MBMS service 2 with second highest priority are followed . . . .

7) The eNB makes dynamic scheduling of radio resources, and indicates to LIE (Mobile Station) how many packets of MBMS service 1 are transmitted, and how many packets of MBMS service 2 are transmitted. This is done inside eNB by a distributed manner.

The outcome of the dynamic scheduling is based on the calculation of the number of buffered packets for respective MBMS services to be multiplexed by eNB, and converts the calculated number to the number of subframes needed to transmit these packets.

The advantage of the distributed management is that the function achieved by BM-SC is simple, but great complexity is brought by the distributed management because most of the management functions have to be distributed in many nodes and meanwhile synchronized behaviors should be guaranteed.

Preferred embodiments of the present invention will be described below with reference to the accompanying drawings.

Figure 2:
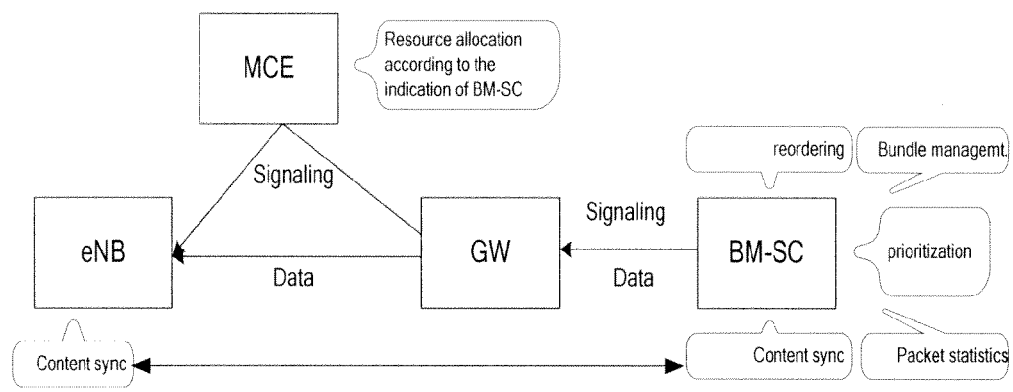
FIG. 2 is a system architecture diagram illustrating the centralized management of resource allocation when MBMS services are multiplexed according to the present invention.

FIG. 2 is a system architecture diagram illustrating the centralized management of resource allocation when MBMS services are multiplexed according to the present invention.

Similar with FIG. 1, network architecture as illustrated by FIG. 2 also comprises BM-SC, GW, eNB and MCE. However, in the system as illustrated by FIG. 2, BM-SC performs centralized management comprising: content synchronization, packet reordering, and part of resource allocation, which is different from the distributed management as illustrated by FIG. 1.

Figure 3:
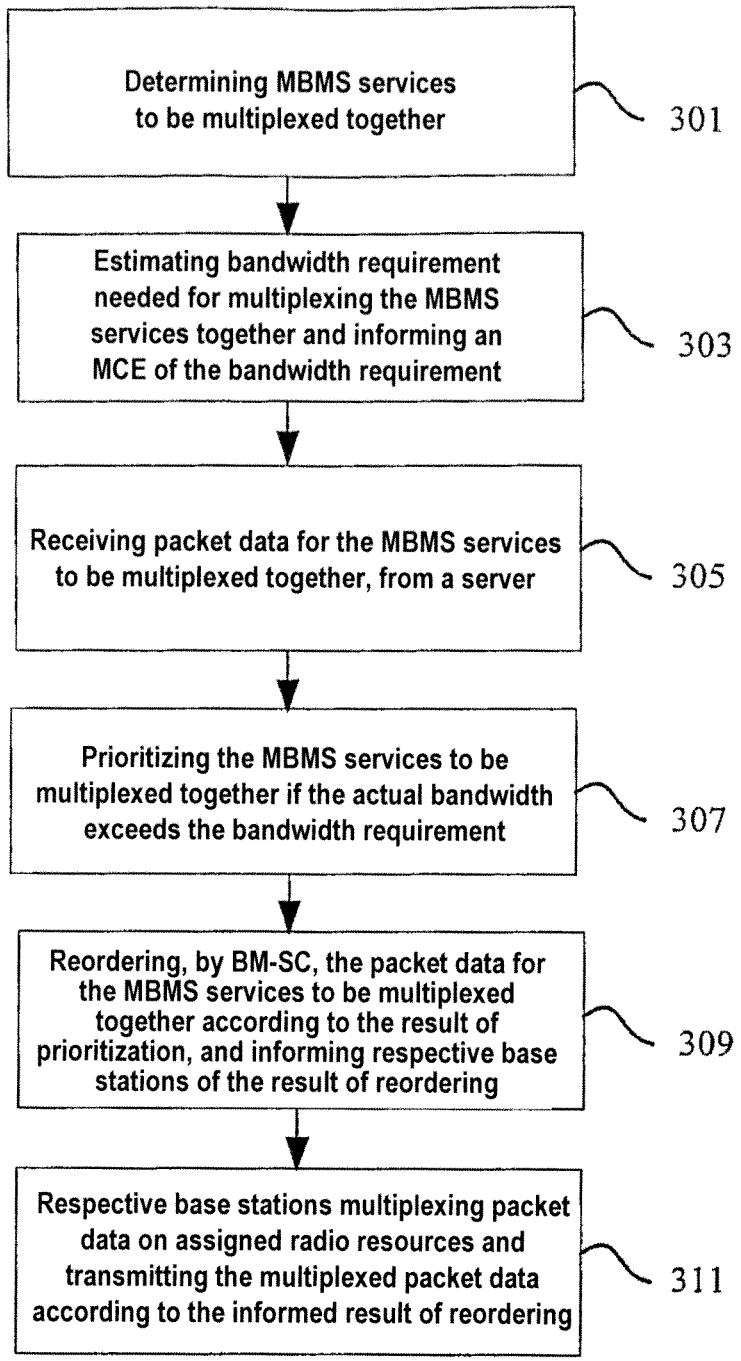
FIG. 3 is a flowchart illustrating the method for multiplexing multiple MBMS services in MBSFN according to the present invention.

FIG. 3 is a flowchart illustrating the method for multiplexing multiple MBMS services in an MBSFN according to the present invention.

In the following, the method for multiplexing multiple MBMS services in the MBSFN will be described with reference to FIG. 2 and FIG. 3.

At step 301, at the session start, BM-SC determines MBMS services to be multiplexed together, i.e. determines which MBMS services will be multiplexed together. This can be determined based on QoS (Quality of Service) requirement such as bit error rates (e.g. Block Error Rates) of the MBMS services.

At step 303, BM-SC estimates bandwidth requirement needed for multiplexing the MBMS services together and informs MCE of the bandwidth requirement so as to assign radio resources by MCE. Here, the bandwidth requirement may be determined by the BM-SC according to QoS (Quality of Service) requirement such as transmission rates or bit error rates of respective MBMS services.

At step 305, BM-SC receives from a server the packet data for MBMS services to be multiplexed together, and buffering the received packet data for the MBMS services, e.g. buffering it with a period of 320 ms.

At step 307, if the actual bandwidth that is occupied by packet data for the MBMS services to be multiplexed together exceeds the bandwidth requirement, e.g. the actual bandwidth that is occupied by the buffered data exceeds the bandwidth requirement, BM-SC prioritizes the MBMS services to be multiplexed together. Here, the prioritization is performed by BM-SC according to the QoS requirement such as transmission rates or bit error rates of respective MBMS services.

At step 309, based on the result of prioritization, BM-SC reorders the packet data for the MBMS services to be multiplexed together, and informs respective base stations in MBSFN area of the result of reordering. For example, the BM-SC reorders the packets for respective MBMS services in a buffer, e.g. adds sequence number 1~N1 to packets for MBMS service 1 with highest priority, and adds sequence number (N1+1)~(N1+N2) to packets for MBMS service 2 with second highest priority . . . . The result of reordering packets may be transmitted by a content synchronization entity in the BM-SC to a counterpart content synchronization entity in eNB.

At step 311, according to the result of reordering (e.g. sequence number added to respective packets) informed by BM-SC, respective base stations multiplex packet data for MBMS services to be multiplexed together, on radio resources assigned by MCE and transmit the multiplexed packet data.

According to the present invention, since BM-SC performs centralized management of resource allocation when multiple MBMS services are multiplexed, it is convenient to meet the requirement for synchronization of MBSFN transmission.

Figure 4:
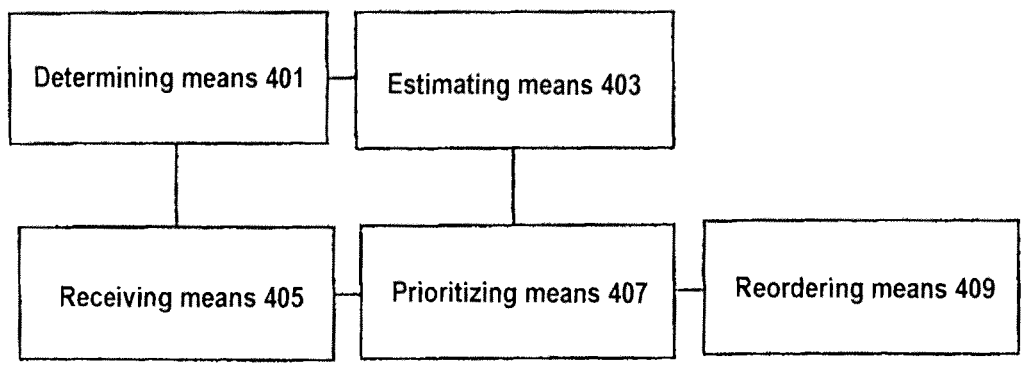
FIG. 4 is an architecture block diagram illustrating the BM-SC for multiplexing multiple MBMS services in MBSFN according to the present invention.

FIG. 4 is an architecture block diagram illustrating the BM-SC for multiplexing multiple MBMS services in MBSFN according to the present invention.

As illustrated by FIG. 4, the BM-SC according to the present invention comprises: determining means 401 for determining, at the beginning of a session, MBMS services to be multiplexed together; estimating means 403 for estimating bandwidth requirement needed for multiplexing the MBMS services together, and informing the MCE of the bandwidth requirement so as to assign radio resources by MCE; receiving means 405 for receiving packet data for the MBMS services to be multiplexed together, from a server; prioritizing means 407 for prioritizing the MBMS services to be multiplexed together if the actual bandwidth that is occupied by packet data for the MBMS services to be multiplexed together exceeds the bandwidth requirement; and reordering means 409 for reordering the packet data for the MBMS services to be multiplexed together according to the result of prioritization, and informing respective base stations in MBSFN area of the result of reordering.

Figure 5:
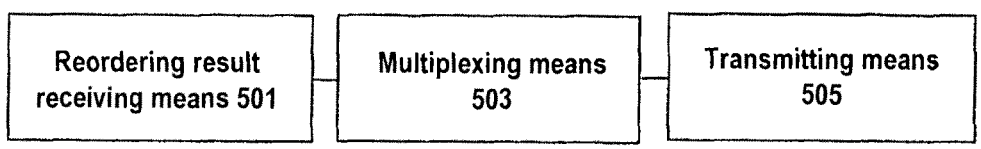
FIG. 5 is an architecture block diagram illustrating the eNB for multiplexing multiple MBMS services in MBSFN according to the present invention.

FIG. 5 is an architecture block diagram illustrating the eNB for multiplexing multiple MBMS services in MBSFN according to the present invention.

The base station according to the present invention comprises: reordering result receiving means 501 for receiving result of reordering packet data for MBMS services to be multiplexed together, informed by BM-SC; multiplexing means 503 for multiplexing packet data for MBMS services to be multiplexed together on the assigned radio resources, according to the received result of reordering packet data for MBMS services to be multiplexed together; and transmitting means 505 for transmitting multiplexed packet data.

Although the present invention has been described above in conjunction with preferred embodiments of the present invention, it should be understood by those skilled in the art that various amendments, substitution and changes may be made to the present invention within the spirit and scope of the present invention. Therefore, the present invention shall not be defined by above embodiments, but be defined by the appending claims and the equivalents thereof.

What is claimed is:

1. A method for multiplexing multiple Multimedia Broadcast Multicast Service (MBMS) services in a Multicast Broadcast Single Frequency Network (MBSFN), comprising:

at the beginning of a session, determining, by a Broadcast Multicast Service Center (BM-SC), MBMS services to be multiplexed together;

estimating, by the BM-SC, a bandwidth requirement needed for multiplexing the MBMS services together and informing an MBMS Coordination Entity (MCE) of the estimated bandwidth requirement so as to assign radio resources by the MCE;

receiving, by the BM-SC, packet data for the MBMS services to be multiplexed together, from a server;

prioritizing, by the BM-SC, the MBMS services to be multiplexed together if the actual bandwidth that is occupied by the packet data for the MBMS services to be multiplexed together exceeds the estimated bandwidth requirement;

reordering, by the BM-SC, the packet data for the MBMS services to be multiplexed together according to the result of prioritization, and informing respective base stations in the MBSFN area of the result of reordering; and multiplexing, by the respective base stations, respective copies of the packet data for the MBMS services to be multiplexed together on radio resources assigned by the MCE and transmitting the respective multiplexed packet data according to the result of reordering informed by the BM-SC.

2. The method according to claim 1, wherein the MBMS services to be multiplexed together are determined by the BM-SC according to Quality of Service (QoS) requirement of bit error rates of the MBMS services.

3. The method according to claim 1, wherein the bandwidth requirement is determined by the BM-SC according to Quality of Service (QoS) requirement of transmission rates or bit error rates of the MBMS services, and the prioritization is carried out by the BM-SC according to Quality of Service (QoS) requirement of transmission rates or bit error rates of the MBMS services.

4. The method according to claim 1, wherein the reordering is to arrange packet data for MBMS services with higher priority prior to packet data for MBMS services with lower priority so that the packet data for the MBMS services with higher priority can be transmitted earlier.

5. The method according to claim 1, wherein the result of reordering is informed by a content synchronization entity in the BM-SC to a counterpart content synchronization entity in a base station.

6. A Broadcast Multicast Service Center (BM-SC) for multiplexing multiple Multimedia Broadcast Multicast Service (MBMS) services in a Multicast Broadcast Single Frequency Network (MBSFN), the BM-SC comprising:

at least one processor configured as:

a multiplex planner for determining, at the beginning of a session, MBMS services to be multiplexed together;

a bandwidth estimator for estimating a bandwidth requirement needed for multiplexing the MBMS services together, and informing an MBMS Coordination Entity (MCE) of the estimated bandwidth requirement so as to assign radio resources by the MCE;

a packet data receiver for receiving packet data for the MBMS services to be multiplexed together, from a server;

a prioritizer for prioritizing the MBMS services to be multiplexed together if the actual bandwidth that is occupied by packet data for the MBMS services to be multiplexed together exceeds the estimated bandwidth requirement; and a scheduler for reordering the packet data for the MBMS services to be multiplexed together according to the result of prioritization, and informing respective base stations in the MBSFN area of the result of reordering.

7. A base station for multiplexing multiple Multimedia Broadcast Multicast Service (MBMS) services in a Multicast Broadcast Single Frequency Network (MBSFN), the base station comprising:

at least one processor configured as:
a packet schedule receiver for receiving the result of reordering packet data for MBMS services to be multiplexed together, informed by a Broadcast Multicast Service Center BM-SC;
a packet multiplexer for multiplexing packet data for MBMS services to be multiplexed together on assigned radio resources, according to the received result of reordering the packet data for the MBMS services to be multiplexed together; and
a multiplexed packet transmitter for transmitting a copy of the multiplexed packet data.

* * * * *